(12) United States Patent
Lee

(10) Patent No.: US 10,461,547 B2
(45) Date of Patent: Oct. 29, 2019

(54) PORTABLE DRONE BATTERY CHARGING SYSTEM

(71) Applicant: COONIX, INC., City of Industry, CA (US)

(72) Inventor: Edward Lee, City of Industry, CA (US)

( * ) Notice: Subject to any disclaimer, the term of this patent is extended or adjusted under 35 U.S.C. 154(b) by 0 days.

(21) Appl. No.: 15/529,080

(22) PCT Filed: Jan. 4, 2017

(86) PCT No.: PCT/US2017/012213
§ 371 (c)(1),
(2) Date: May 23, 2017

(87) PCT Pub. No.: WO2017/120256
PCT Pub. Date: Jul. 13, 2017

(65) Prior Publication Data
US 2018/0294659 A1 Oct. 11, 2018

Related U.S. Application Data
(60) Provisional application No. 62/274,749, filed on Jan. 4, 2016.

(51) Int. Cl.
| | |
|---|---|
| H02J 7/00 | (2006.01) |
| H01M 10/44 | (2006.01) |
| H01M 10/46 | (2006.01) |
| H01M 10/48 | (2006.01) |
| H02J 7/04 | (2006.01) |

(52) U.S. Cl.
CPC ............ *H02J 7/0026* (2013.01); *H01M 10/44* (2013.01); *H01M 10/441* (2013.01); *H01M 10/46* (2013.01); *H01M 10/48* (2013.01); *H02J 7/0003* (2013.01); *H02J 7/0045* (2013.01); *H02J 7/0073* (2013.01); *H02J 7/045* (2013.01)

(58) Field of Classification Search
CPC ...................................................... H02J 7/0054
USPC ........................................................ 320/103
See application file for complete search history.

(56) References Cited

U.S. PATENT DOCUMENTS

| | | | |
|---|---|---|---|
| 5,583,416 A | 12/1996 | Klang | |
| 5,589,757 A | 12/1996 | Klang | |
| 2010/0295503 A1 | 11/2010 | Bourilkov et al. | |
| 2015/0097514 A1* | 4/2015 | Yang | H02J 7/0054 320/103 |
| 2015/0158392 A1* | 6/2015 | Zhao | B60L 11/1861 320/109 |
| 2015/0357834 A1 | 12/2015 | McClean et al. | |

OTHER PUBLICATIONS

PCT/US2017/012213. Int'l Search Report & Written Opinion (dated Mar. 27, 2017).
European Search Report for European Application No. 17736277.9, dated Aug. 8, 2019, 6 pages.

* cited by examiner

*Primary Examiner* — Edward Tso
*Assistant Examiner* — Ahmed H Omar
(74) *Attorney, Agent, or Firm* — Loza & Loza, LLP; George G. C. Tseng

(57) ABSTRACT

A portable drone battery charger that charges a variety of batteries of different capacities as well as voltage levels is provided. The drone battery charger operates from an internal battery and may charge a drone battery multiple times because the capacity of the drone battery charger internal battery is many times larger than the done battery.

1 Claim, 3 Drawing Sheets

PORTABLE DRONE BATTERY CHARGING SYSTEM

BACKGROUND

Field

Aspects of the present disclosure relate generally to portable battery charging systems, and more particularly, to a portable drone battery charging system.

Background

Many battery charging systems are available on the market. However, the battery charging needs of drone aircrafts are specific for these devices and common systems have not addressed them adequately.

As the demand for flight times increase, it will be important to address battery recharging issues in-field.

SUMMARY

The following presents a simplified summary of one or more aspects of the disclosed approach, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a drone battery charging system that is portable.

Another aspect of the disclosure provides a drone battery charging system that provides recharging of its battery from multiple sources, including direct current (DC) and alternating current (AC) sources.

Yet another aspect of the disclosure provides a portable drone battery charging system that may charge multiple batteries simultaneously.

Still yet another aspect of the disclosure provides a portable drone battery charging system that may manage the safe charging of multiple batteries independently from each other.

Still yet another aspect of the disclosure provides a portable drone battery charging system that may manage the charging of multiple batteries, each battery being of a different type.

These and other aspects of the invention will become more fully understood upon a review of the detailed description, which follows.

BRIEF DESCRIPTION OF THE DRAWINGS

These and other sample aspects of the disclosure will be described in the detailed description that follow, and in the accompanying drawings.

Figure 1:
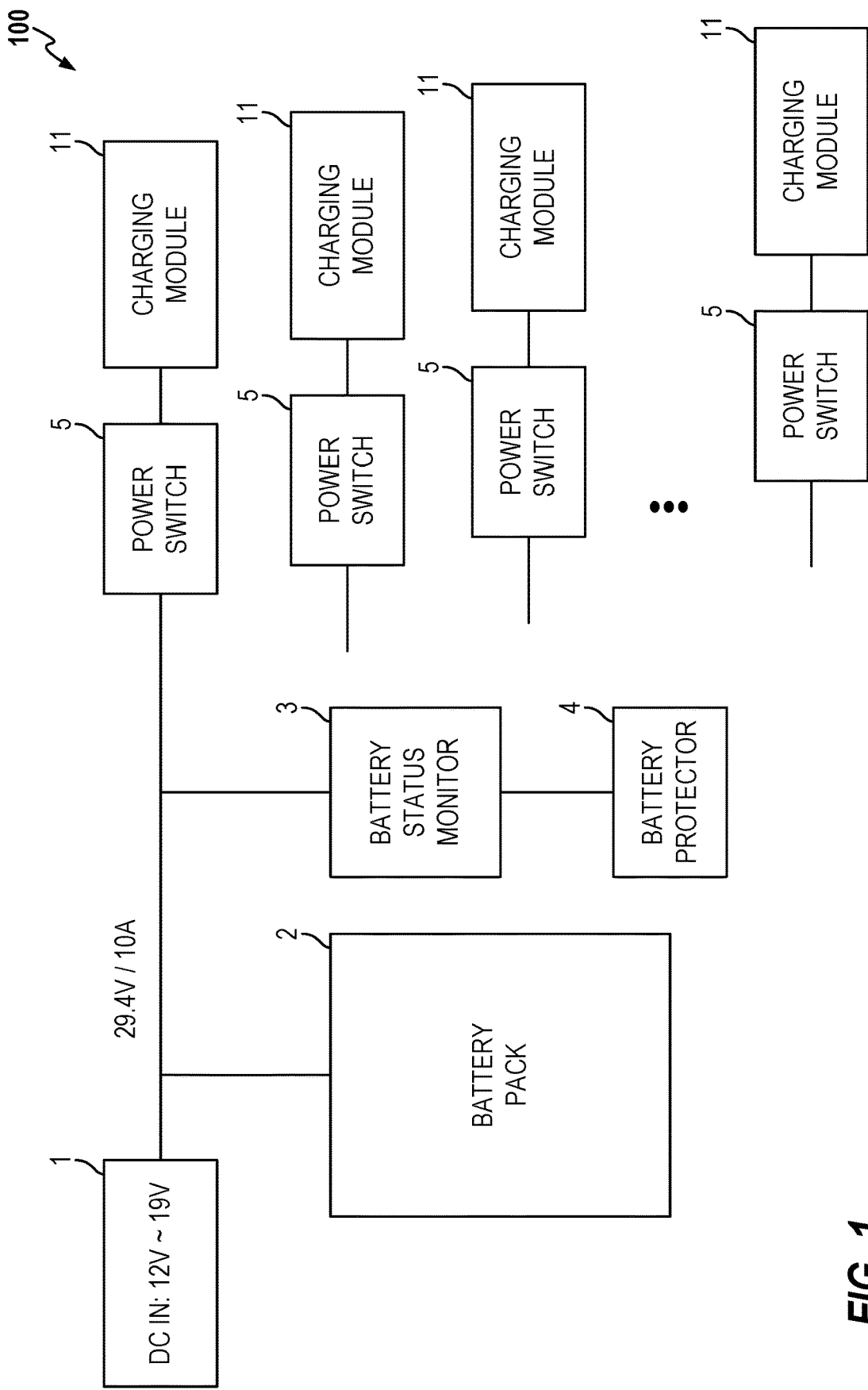
FIG. 1 is a block diagram conceptually illustrating an example of a portable drone battery charging system configured in accordance with various aspects of the disclosed drone battery charging system.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A drone battery charging system configured in accordance with various aspects of the disclosed portable drone battery charging system is illustrated in FIG. 1 as a drone battery charging system 100. the drone battery charging system 100 includes a DC input 1, a battery pack 2, a battery status monitor 3, a battery protector 4, a power switch 5, and a charging module 11.

The DC input 1 is a DC power source, preferably providing a voltage at a level ranging from 12 v to 19 v. An example of a suitable DC power source is a car or marine battery. As described further below, the DC input 1 is used to charge the drone battery charging system 100 for portable use.

The battery pack 2 allows the drone battery charging system 100 to be used away from the DC power source, and includes at least one battery pack for powering the charging module 11. In one aspect of the disclosed system, the battery pack 2 includes as many as seven (7) lithium (10-polymer batteries with an output of approximately 16~20 amps at 29.4V.

The battery status monitor 3 provides monitoring of voltage and capacity of the system.

The battery protector 4 provides over-current as well as over/under voltage protection.

The power switch 5 activates the charging modules in the charging module 11, as further described herein.

Figure 2:
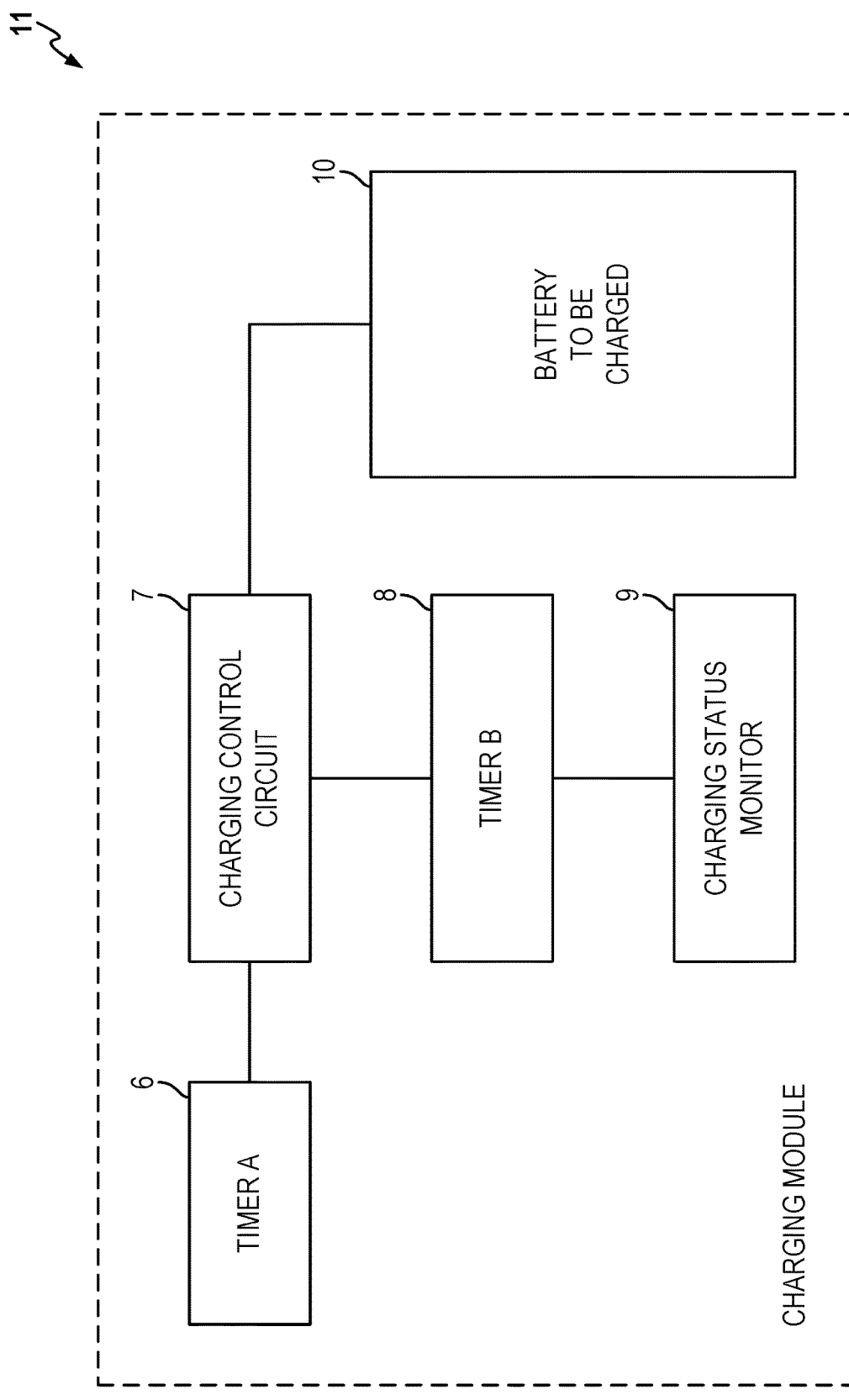
FIG. 2 is a block diagram conceptually illustrating an example of a charging module configured in accordance with various aspects of the disclosed drone battery charging system.

The charging module 11, as shown in FIG. 2, includes a timer module A 6, a charging control circuit 7, a timer module B 8, and a charging status monitor 9. The charging module 11 is used to charge the to be charged battery 10. An example of the to be charged battery 10 may include a 17.5 v battery such as those used for the DJI™ Phantom 3 drone system. The charging module 11 may be used to charge other types of drone batteries.

The timer module A 6 may be used to shut down the charging control circuit 7, the timer module B 8, and the charging status monitor 9 in a predetermined number of seconds (such as 30 seconds) if the to be charged battery 10 is not detected/connected after the power switch 5 is pressed.

The charging control circuit 7 provides control of the charging activity, and will start when the power switch 5 is pressed.

The timer module B 8 will active the charging status monitor 9 after 40 seconds when the power switch 5 is pressed.

The charging status monitor 9 may be activated by the timer module B 8, and will shut down the charging control circuit 7 if the connected battery's voltage is higher than the setting voltage.

Figure 3:
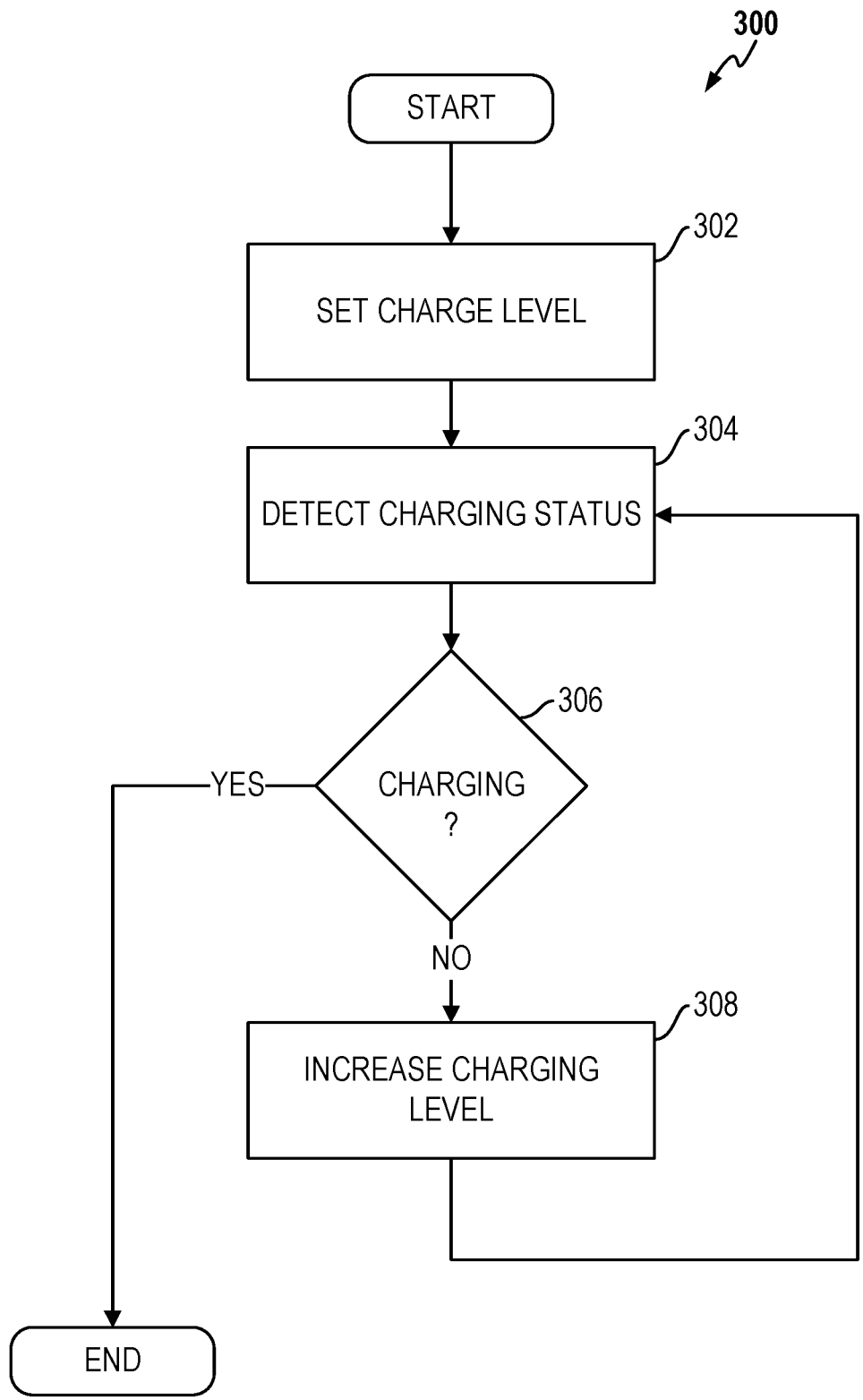
FIG. 3 is a flow diagram conceptually illustrating operation of the charging module configured in accordance with various aspects of the disclosed drone battery charging system.

FIG. 3 illustrates a process 300 where the charging module 11 is able to charge batteries of different types in accordance to various aspects of the disclosed approach.

At 302, the charging module 11 sets a first charge level at which the charging module 11 will attempt to charge the battery. In one aspect of the disclosed approach, this level is the lowest level with which the charging module 11 may work. For example, the battery pack may be the smallest battery pack in terms of number of cells, such as a single cell.

At 304, the charging module 11 detects a charging status of the battery. In one aspect of the disclosed approach, the charging module 11 may attempt to detect an amount of current flowing to the battery. In another aspect of the disclosed approach, the charging module 11 may attempt to detect an information signal being communicated with the battery. This information signal may include charging status as well as other sideband information, such as current, voltage, temperature, etc., as reported from the battery.

At 306, the charging module 11 determines if the battery is charging based on the detected current from 304. In one aspect of the disclosed approach, the charging module 11 may determine whether the battery is being charged based on a minimal amount of detected current. In another aspect of the disclosed approach, the charging module 11 may determine whether the battery is being charged based on detected current over a period of time. In yet another aspect of the disclosed approach, the charging module 11 may determine whether the battery is being charged based on other detected signals. If it is determined that the battery is being charged, then operation of the process 300 will end. Otherwise, operation will continue with 308.

At 308, the charging module 11 will increase the charging level to the next level for a battery of a larger size. For example, the charging level will be increased for a battery with a higher number of cells. Operation will then return to 304, where the charging module 11 will detect charging status.

Through the process 300, the charging module 11 may charge a variety of battery types safely. The process 300 thus provides the charging module 11 to ensure compatibility with a variety of batteries because proper voltage, current, and other levels may be detected and controlled. For example, by slowly increasing the charge level, a battery of a lower number of cells will not be charged with voltage levels that are larger than what that battery may handle.

Those of skill would appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"). The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects, a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The invention claimed is:

1. A portable charging system for charging a multi-cell drone battery, comprising:
   a) a system battery configured to power the portable charging system during a portable operation to charge the multi-cell drone battery;
   b) a recharging circuit for providing, in a system battery recharge operation, the system battery with sufficient charge for powering the portable operation to charge the multi-cell drone battery, the recharging circuit comprising:
      a power input for receiving power during the system battery recharge operation of the system battery; and
      a protector coupled between the power input and the system battery, the protector configured to protect the system battery during the system battery recharge operation;
   c) a charging module coupled to the system battery and configured to receive power from the system battery to charge the multi-cell drone battery in a drone battery charge operation as part of the portable operation, the charging module comprising:
      a drone battery charge control circuit configured to provide charging control of the multi-cell drone battery during the drone battery charge operation; and
      a drone battery charging status monitor coupled to the drone battery charge control circuit, the drone battery charging status monitor being configured to control operation of the drone battery charge control circuit based on a multi-cell drone battery status; and
   d) a drone battery connector configured to connect the multi-cell drone battery to the charging module;
   wherein the charging module further comprises a power switch coupled to the drone battery charge control circuit, the power switch configured to initiate the drone battery charge operation, and wherein the charging module further comprises a timer configured to disable the drone battery charge control circuit after the drone battery charge operation has been initiated by the power switch when the multi-cell drone battery has not been detected to be connected to the drone battery connector within a certain amount of time.

* * * * *